United States Patent Office 3,755,475
Patented Aug. 28, 1973

3,755,475
PROCESS FOR THE RECOVERY OF HALOALKANES
Robert Fuhrmann, 32 Cross Road, Morris Plains, N.J. 07950; John Pisanchyn, 15 Washington Place, Morristown, N.J. 07960; and Fred W. Koff, 288 Parker Ave., Clifton, N.J. 07015
No Drawing. Continuation-in-part of application Ser. No. 720,480, Apr. 11, 1968. This application Feb. 25, 1971, Ser. No. 118,981
Int. Cl. C07c 17/38
U.S. Cl. 260—652 P          7 Claims

ABSTRACT OF THE DISCLOSURE

A process for the separation of haloalkanes from alkanes in a mixture containing the same whereby the mixture is dissolved in a ketone solvent, the temperature lowered below the solidification temperature of the alkanes, and separation of the liquid and solid phases effected. The liquid phase, enriched in haloalkanes, is treated to remove the solvent while the solid phase, enriched in alkanes, may be warmed and recycled. The process is particularly applicable to mixtures derived from the free radical halogenation of alkanes to provide a product stream containing a high proportion of haloalkanes useful in the preparation of alkylbenzenes, alkylphenols and olefins.

---

This application is a continuation-in-part of our copending application Ser. No. 720,480, filed Apr. 11, 1968, now abandoned.

This invention relates to a process for separating haloalkanes from alkanes. More particularly this invention relates to a process for separating haloalkanes from alkanes by solidification of the alkanes from a ketone solution.

BACKGROUND OF THE INVENTION

Detergents are prepared from alkylbenzenes obtained by alkylation of benzene with long chain haloalkanes. Haloalkanes can be prepared by direct free radical halogenation of the corresponding alkanes. In commercial practice the alkanes comprise a mixture of a homologous series of alkanes, particularly $C_{12}$ to $C_{15}$ alkanes which, upon halogenation, yield a multi-component stream including monohaloalkanes, polyhaloalkanes and unreacted alkanes. The separation of the halogenated products from the unreacted alkanes by fractional distillation is impractical due to the similarity and overlapping of the boiling points of the various components of such a mixture. Thus, according to current practice, the halogenated product is used directly to alkylate benzene and separation of the unreacted alkane is performed after the alkylation step. However, the large quantities of unreacted alkane present greatly decreases the efficiency of the alkylator. A halogenated product stream containing an increased concentration of haloalkanes and a decreased concentration of unreacted alkanes would materially increase the efficiency of the alkylation step and thus lower the overall cost of preparing detergents.

SUMMARY OF THE INVENTION

Thus it is the principal object of the present invention to provide a method for the separation of haloalkanes from alkanes in a mixture containing the same.

It is another object to provide a process for enrichment in haloalkanes of a multi-component product stream obtained from the halogenation of alkane mixtures and a depletion in alkanes of the product stream.

Further objects will become apparent from the following detailed description thereof.

We have discovered a rapid, simple process for the separation of haloalkanes from alkanes in a mixture containing the same whereby a solution containing alkanes and haloalkanes in a ketone solvent is cooled to a temperature below the solidification temperature of the alkane component but not below that of the haloalkane component and the solidified alkane separated from the ketone solution containing the haloalkanes. The alkane solids can be reliquefied by warming and recycled to prepare additional haloalkanes if desired. The haloalkanes can be separated from the ketone solvent by conventional methods, as by evaporation of the solvent. After separation of the solids and the solvent, the resultant mixture will be enriched in haloalkanes and proportionally depleted in alkanes, thereby providing a mixture more concentrated in haloalkanes than the starting mixture. When the process of the invention is operated under preferred conditions, the haloalkane product mixture will contain 10% by weight or less of alkanes.

DETAILED DESCRIPTION OF THE INVENTION

The process of the invention is particularly appropriate for the separation of haloalkanes obtained from the halogenation of a mixture of alkanes having from 6 to 30 carbon atoms. The term "alkane" is meant to include straight chain, branched chain, or cyclic alkanes. The preferred alkanes are mixtures of a homologous series of alkanes having from 12 to 15 carbon atoms. The halogenated mixtures contain, in addition to unreacted alkanes, primary and secondary monohaloalkanes, and generally also contain between about 5 to about 40 mol percent of their corresponding dihaloalkanes as well as minor amounts of other polyhaloalkanes. The term "halogen" is meant to include fluorine, chlorine, bromine, and iodine. Chlorine is preferred due to its lower cost.

The solvents useful in the present invention include ketones having from 3 to 6 carbon atoms. Suitable ketones are for example dialkyl ketones which include acetone, methyl ethyl ketone, methyl isopropyl ketone, methyl isobutyl ketone and cyclopentanone and cyclohexanone and the like.

The mixture to be separated is dissolved in a suitable ketone in an amount so that the solution contains from about 5% to about 50% by weight of the mixture. These concentrations will provide a readily filterable slurry when cooled. Concentrations of the mixture below about 5% by weight are uneconomical to process whereas concentrations above about 50% by weight produce a cake of alkane crystals which is difficult to handle. Generally concentrations of about 10% to about 25% by weight are preferred, depending upon the relative proportions of alkanes to haloalkanes in the starting mixture.

The temperature of the solution is lowered to at least about 3° C. preferably to about 10 to about 30° C. below the solidification temperature of the lowest melting alkane present. The temperature should be maintained high enough, however, so that substantial quantities of haloalkanes are not precipitated. Temperatures of from about −20° to about −40° C. are preferred for the preferred alkane-haloalkane mixtures having 12–15 carbon atoms.

The cooling time depends upon the type and efficiency of the equipment used and the mixture to be separated, but in general good yields of alkane crystals will be obtained after 5 to 60 minutes of cooling. The optimum temperature of cooling and concentration of solution for the maximum degree of separation of alkanes and haloalkanes for a particular system can be readily determined by test runs by one skilled in the art.

The solid alkane crystals are separated from the ketone solution at or below the solidification temperature in any convenient manner, as by decanting, filtering, centrifuging and the like. The solids can be liquefied and recycled to the halogenation step directly, or, if a particularly pure product is required, they can be first washed with cold solvent or recrystallized from a ketone solvent.

The filtrate or portions thereof optionally can be recycled to the crystallization step. A more concentrated solution of chloroalkanes can thus be obtained prior to solvent recovery.

The solution enriched in the haloalkanes can be treated to remove the solvent by known means such as evaporation or flash distillation. The solvent is recycled to dissolve additional amounts of haloalkane-alkane mixtures.

The process of the invention can be adapted to batchwise, semi-continuous or continuous separation as will be known to one skilled in the art.

The excellent separation of certain haloalkanes from alkanes obtained by direct halogenation of an alkane mixture under preferred conditions according to the invention demonstrates the surprising absence of mixed crystal formation in the precipitated solids. The resultant product stream containing relatively high concentrations of haloalkanes is suitable for use in the alkylation of benzene as well as for the preparation of alkyl phenols and olefins.

The invention will be further illustrated by the following examples, but it is to be understood that the invention is not meant to be limited to the details disclosed therein. In the examples parts and percentages are by weight unless otherwise noted.

EXAMPLE 1

25 parts by volume of a dodecane chlorination mixture containing 4.847 parts or 25.24% of chlorinated dodecane and 74.6% of unreacted dodecane were admixed with 75 parts by volume of acetone in a suitable vessel and maintained at −21° C. for 1.5 hours. The crystalline dodecane precipitate was filtered while maintaining the temperature of the slurry at −21° C.

The filtrate containing the solvent and most of the chlorododecanes was freed of solvent by flash distillation at 50° C.

5.54 parts of solvent-free liquid product were recovered containing 41.34% of dodecane and 58.66% of chlorododecane.

EXAMPLE 2

22.5 parts by volume of dodecane chlorination mixture as in Example 1 were admixed with 127.5 parts by volume of acetone and cooled to −40° C. for 1.5 hours. The crystalline dodecane precipitate was filtered at −40° C.

The filtrate containing the solvent and chlorododecane was freed of solvent as in Example 1.

4.156 parts of solvent-free product were recovered containing 11.0% of dodecane and 89.0% of chlorododecanes.

Thus increasing the solvent to alkane-chloroalkane feed and lowering the temperature of crystallization improved the separation of chlorododecanes from unreacted dodecane.

EXAMPLE 3

25 parts by volume of a product stream obtained by chlorinating a mixture of dodecane and tetradecane containing 20.7% of chloroalkanes were admixed with 100 parts by volume of acetone and cooled to −40° C. The crystalline alkane mixture was filtered at −40° C.

The filtrate was freed of solvent as in Example 1.

3.613 parts of solvent-free product were recovered containing 90.39% of chloroalkane.

EXAMPLE 4

25 parts by volume of a product stream obtained by chlorinating a mixture of dodecane, tridecane, and tetradecane containing 31.0% of chloroalkanes were admixed with 142 parts by volume of acetone and cooled to −40° C. The solid alkane precipitate was filtered at −40° C. The filtrate was freed of solvent as in Example 1.

5.372 parts of solvent-free product were recovered containing 92.85% of chloroalkanes.

EXAMPLE 5

25 parts by volume of a product stream obtained by chlorinating dodecane containing 25.3% of chlorododecanes were admixed with 25 parts by volume of methyl ethyl ketone and cooled to −21° C. The crystalline paraffin precipitate was filtered at −21° C. and the solvent removed from the chloroalkane enriched filtrate as in Example 1.

14.825 parts of solvent-free product were recovered containing 39.9% of chlorododecanes.

The procedure is repeated by cooling to −40° C. The separation of chlorododecanes from dodecane is improved.

EXAMPLE 6

75 parts by volume of a cyclohexane chlorination product containing 29.8% of chlorocyclohexanes and 70.2% of cyclohexane were admixed with 75 parts by volume of acetone and cooled to −40° C. for 1.5 hours. The crystallized cyclohexane was filtered at −40° C. and the solvent removed from the filtrate as in Example 1.

39.26 parts of solvent-free product were recovered containing 38.6% of chlorocyclohexanes and 61.4% of cyclohexane.

It will be apparent that many modifications and variations may be effected without departing from the novel concepts of the present invention, and the illustrative details disclosed are not to be construed as imposing undue limitations on the invention.

What is claimed is:

1. A process for the separation of haloalkanes, straight chain, branched chain or cyclic, of 6–30 carbon atoms from corresponding straight chain, branched chain or cyclic alkanes of 6–30 carbon atoms in a mixture containing them which comprises dissolving the mixture in a solvent which is a ketone of 3–6 carbon atoms selected from the group consisting of dialkyl ketones, cyclopentanone and cyclohexanone so that the resultant solution contains from about 5 percent to about 50 percent by weight of the mixture, cooling the resultant solution to a temperature at least 3° C. below the solidification temperature of the lowest melting alkane present but without precipitating substantial quantities of haloalkanes, separating the solid alkanes from the solution and treating the resultant solution to remove the solvent.

2. A process according to claim 1 wherein the haloalkanes are chloroalkanes.

3. A process according to claim 1 wherein the alkanes and haloalkanes have 12–15 carbon atoms.

4. A process according to claim 3 wherein the temperature of cooling is from about −20 to −40° C.

5. A process according to claim 1 wherein the solvent is selected from the group consisting of acetone and methyl ethyl ketone.

6. A process according to claim 1 wherein the concentration of the mixture in the solvent is from 10% to about 25% by weight.

7. A process according to claim 1 wherein the temperature is from about 10° C. to about 30° C. below the solidification temperature of the lowest melting alkane present.

(References on following page)

References Cited

UNITED STATES PATENTS

| | | | |
|---|---|---|---|
| 2,189,924 | 2/1940 | Pier et al. | 260—652 PU |
| 2,725,338 | 11/1955 | Perry | 23—273 FX |
| 2,979,453 | 4/1961 | Kiersted et al. | 260—707 X |
| 2,813,099 | 11/1957 | Weedman | 260—707 X |
| 2,882,215 | 4/1959 | Dale | 260—707 X |

OTHER REFERENCES

Vogel, Textbook of Practical Organic Chemistry, 3rd ed., John Wiley & Sons, New York (1962) pp. 122–126.

Weiss Berger, Technique of Organic Chemistry, Interscience Publ., New York, vol. III, 2nd ed. (1956) pp. 549–550, 559.

Handbook of Chemistry & Physics, Chemical Rubber Co., Cleveland Ohio, 46th ed. (1965) pp. C–294, C–349, C–356.

HOWARD T. MARS, Primary Examiner

U.S. Cl. X.R.

260—648 R, 648 F, 653

UNITED STATES PATENT OFFICE
CERTIFICATE OF CORRECTION

Patent No. 3,755,475          Dated   August 28, 1973

Inventor(s)  Robert Fuhrmann, et al.

It is certified that error appears in the above-identified patent and that said Letters Patent are hereby corrected as shown below:

On the cover sheet, in the heading, line 7, after "Clifton,

N.J. 07015" insert -- Assignee: Allied Chemical Corporation,

New York, N.Y., a corporation of N.Y. --.

Signed and sealed this 30th day of April 1974.

(SEAL)
Attest:

EDWARD M.FLETCHER,JR.                C. MARSHALL DANN
Attesting Officer                    Commissioner of Patents